United States Patent
Ludewig et al.

(10) Patent No.: US 8,055,931 B2
(45) Date of Patent: Nov. 8, 2011

(54) METHOD FOR SWITCHING BETWEEN TWO REDUNDANT OSCILLATOR SIGNALS WITHIN AN ALIGNMENT ELEMENT

(75) Inventors: Ralf Ludewig, Schoenaich (DE); Thuyen Le, Taufkirchen (DE); Tilman Gloekler, Gaertringen (DE); Willm Hinrichs, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 12/246,123

(22) Filed: Oct. 6, 2008

(65) Prior Publication Data

US 2009/0100283 A1  Apr. 16, 2009

(30) Foreign Application Priority Data

Oct. 12, 2007  (EP) .................................... 07118351

(51) Int. Cl.
*G06F 1/04* (2006.01)
(52) U.S. Cl. ............. 713/500; 331/49; 331/55; 331/172
(58) Field of Classification Search .................. 713/500, 713/600, 601; 714/25, 34, 55; 331/49, 55, 331/172
See application file for complete search history.

(56) References Cited

U.S. PATENT DOCUMENTS

| | | | | |
|---|---|---|---|---|
| 4,949,052 A * | 8/1990 | Chigira | ........................... | 331/49 |
| 5,371,764 A * | 12/1994 | Gillingham et al. | .......... | 375/354 |
| 6,218,908 B1 * | 4/2001 | Oberhammer | ................... | 331/56 |
| 6,970,045 B1 * | 11/2005 | Lichter et al. | .................... | 331/2 |
| 7,173,495 B1 * | 2/2007 | Kenny et al. | ..................... | 331/49 |
| 7,619,484 B2 * | 11/2009 | McCoy | ............................. | 331/49 |
| 7,840,190 B2 * | 11/2010 | Saban et al. | .................... | 455/76 |
| 2004/0046613 A1 * | 3/2004 | Wissell | ........................... | 331/46 |
| 2006/0179364 A1 * | 8/2006 | Swaney et al. | ................ | 714/100 |
| 2007/0061605 A1 * | 3/2007 | Engler et al. | ................... | 713/500 |
| 2008/0072097 A1 * | 3/2008 | Check et al. | ................... | 713/500 |

\* cited by examiner

*Primary Examiner* — Glenn A Auve
(74) *Attorney, Agent, or Firm* — Adam M. Steadman; Thomas E. Tyson

(57) ABSTRACT

A method is provided for switching between two oscillator signals within an alignment element. In accordance with the method, one of the two oscillator signals one is selected as a first master signal in order to provide an output stepping signal at an output of the alignment element. The method comprises introducing a virtual stepping signal when a switch between the two oscillator signals occurs or when a failure in the first master signal is detected. The method further comprises sending the virtual stepping signal to the output of the alignment element in the event of a switch until an alignment with a new master signal is completed.

9 Claims, 5 Drawing Sheets

METHOD FOR SWITCHING BETWEEN TWO REDUNDANT OSCILLATOR SIGNALS WITHIN AN ALIGNMENT ELEMENT

CROSS-REFERENCE TO RELATED APPLICATIONS

This application claims priority under 35 U.S.C. §119 to European Patent Application No. 07118351.1 filed Oct. 12, 2007, the entire text of which is specifically incorporated by reference herein.

BACKGROUND OF THE INVENTION

The various embodiments described herein relate to the field of multiprocessor systems, and more specifically to the field of aligning timing signals among processors to achieve time synchronous operation.

In a typical multiprocessor architecture (e.g., architecture of state-of-the art servers), correct time of day (TOD) information for each processor is of utmost importance. The TOD information is used for database time stamp operations and generally for transaction processing. In such a multiprocessor environment, the TOD information may be synchronized between all processors using physical and usually redundant interconnections that propagate a TOD stepping signal in a serial manner.

U.S. Publication No. 2006/0179364 A1 discloses a stepping pulse network, which comprises an alignment element that allows selecting a stepping signal from among two oscillator signals. As a result, two TOD oscillators provide at least one valid oscillator signal even in the event of a failure. A designated master chip observes a signal criterion of the valid oscillator signal and uses the valid oscillator signal to generate an immediate TOD stepping signal.

Figure 1:
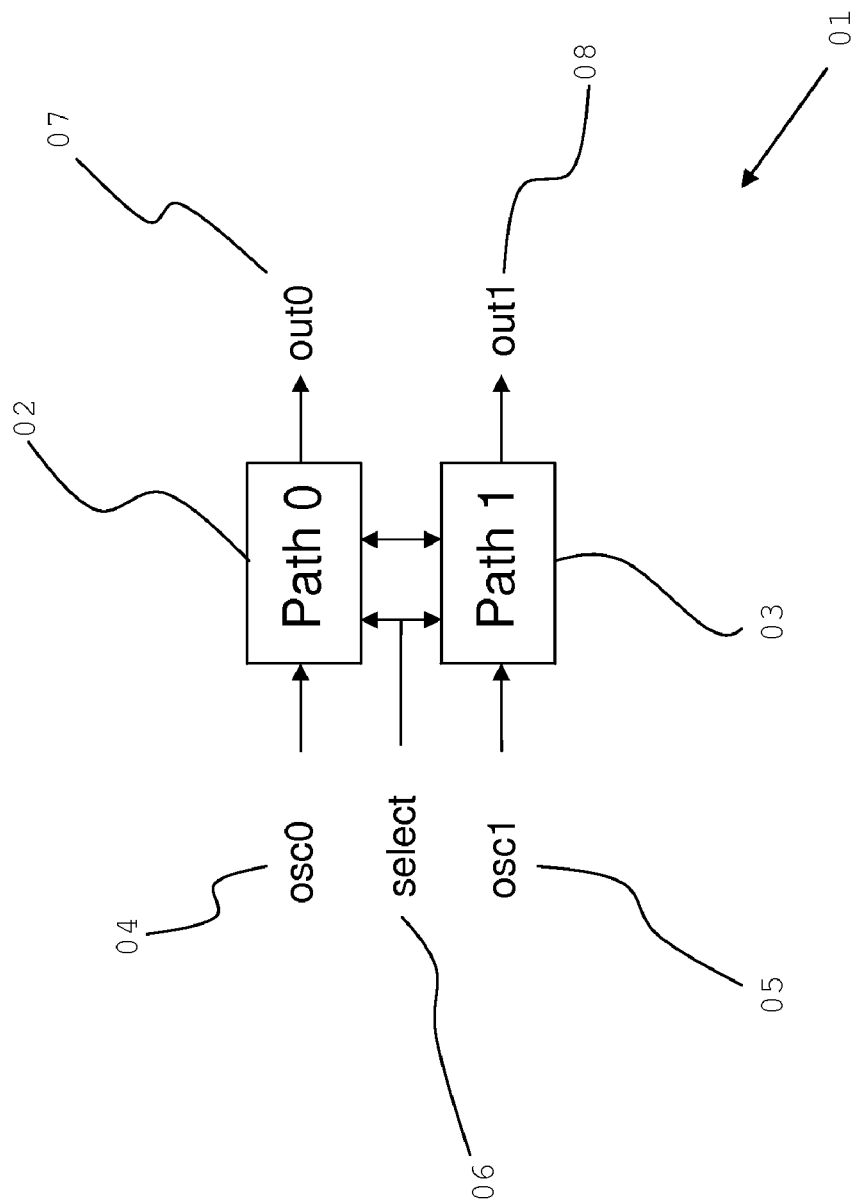

FIG. 1 shows a schematic of an alignment element 01 with two oscillator signals 04 and 05 as input and a control signal 06, which is used to select an active path 02, 03 as a master path and the oscillator signal 04, 05 as a master signal to generate an output stepping signal 07, 08 at an output of the alignment element 01. The output stepping signal 07, 08 is used to generate a TOD stepping signal within a stepping pulse network connected with the output of the alignment element 01.

Figure 2:
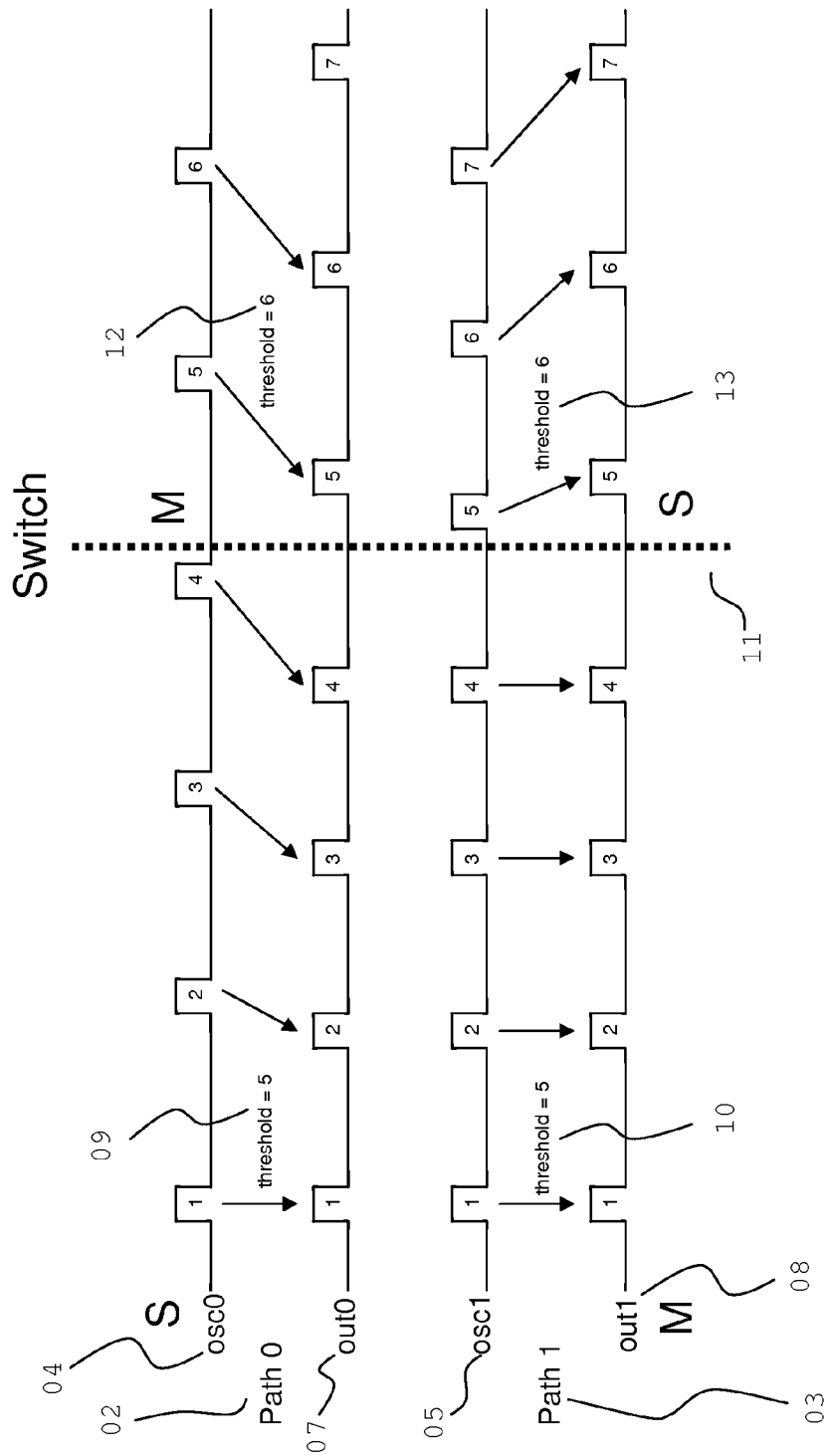

In the known solution provided by the state of the art, output stepping signals 07, 08 are generated by counters with an adjustable threshold value (FIG. 2). The threshold value 10 for the master path M, which in FIG. 2 is path 03, remains constant and is used to generate the output stepping signal 08 of the master path 03 as a function of the connected oscillator signal 05. The threshold value 09 of the slave path S, which in FIG. 2 is path 02, is computed such that the generated output stepping signal 07 of the slave path S is exactly aligned to the output stepping signal 08 of the master path M. In the event of a path switch 11, the threshold value 12 of the former slave path S 02, which becomes the new master path M, is frozen to the threshold value of the new master path M. The threshold value 13 of the new slave path S 03 is adjusted as exemplarily shown in FIG. 2.

This state-of-the-art routine works correctly as long as the offset between two oscillator signals 04, 05 only differs by one cycle within a step and none of the oscillator signals 04, 05 fails while being the input signal for the master path M.

When the oscillator signals differ by more than one cycle per step, the relevant logic needs some time to achieve the alignment. During this timeframe, no path switch can be done without inducing a phase jump in the output stepping signal.

Thus, the switch may be delayed until the control loop has reached its target value and the output stepping signals are aligned correctly again. A drawback of this solution is that in some scenarios it can take a long time until the switch is completed. Furthermore, there is no way to handle sudden failures of the oscillator signal master path. The logic can only be used to manually switch the output stepping signal to one path while the oscillator of the other path is being replaced.

SUMMARY OF THE INVENTION

The objective of the embodiments described herein is to provide a method for switching between two redundant oscillator signals for time of day information within an alignment element that allows for the handling of sudden failures of the oscillator signals and that allows for switching between oscillator signals used for the master path without a phase jump.

This objective is met by a method for switching between two preferably redundant oscillator signals within an alignment element (e.g., an alignment element for a stepping pulse network). The method involves selecting one of the two oscillator signals as a first master signal in order to provide a stepping signal at an output of the alignment element, and this output stepping signal permits generation of a TOD stepping signal. The method comprises introducing a virtual stepping signal (i.e., a virtual master signal) when a switch between the two oscillator signals occurs or when a failure in the first master signal is detected. The method further comprises sending the virtual stepping signal to the output of the alignment element in the event of a switch until an alignment with a new master signal is completed. The method further comprises sending the virtual stepping signal to the output of the alignment element in the event of a failure in the first master signal until a logic (e.g., an external control logic) switches to the other oscillator signal as a new master signal or until the first master signal is valid again.

It is important to note that the first master signal referred to in said method may not have been the original master signal used within the alignment element. That is to say, the first master signal may be the oscillator signal that is selected as the master signal at the time said method commences—i.e., the "first" language may be used in a relative sense.

Said method is advantageous over the state of the art. Said method not only enables a switch from one path to the other (i.e., a switch from one oscillator input to the other) without a phase jump but also enables a switch to a virtual stepping signal when the alignment logic of the alignment element detects a failure in the first master signal. Thus, the method according to the various embodiments described herein enables both phase shift compensation and failure prevention.

The advantages of the various embodiments described herein are achieved by introducing a virtual stepping signal when a switch occurs or when a failure in the first master signal is detected. In the event of a path switch, the virtual stepping signal is sent to the output until alignment with a new master signal is completed. In the event of a failure in the first master signal, the virtual stepping signal is used until a logic (e.g., an external control logic) switches to the other path (i.e., to a new master signal) or until the first master signal becomes valid again.

In an exemplary embodiment, the oscillator signal selected as the first master signal is monitored in order to detect a failure. When a failure in the selected oscillator signal is detected, the alignment element switches from the selected oscillator signal to the other oscillator signal to be used as a new master signal.

In another exemplary embodiment, the virtual stepping signal continues to send as the output stepping signal a signal with the last measured time distance between two consecutive stepping pulses of the first master signal.

In another exemplary embodiment, the virtual stepping signal is moved to the first master signal until both are correctly aligned if the first master signal becomes valid again.

In another exemplary embodiment, alignment of the virtual stepping signal and a new master signal is performed by moving the virtual stepping signal towards the new master signal and by adjusting an initial threshold value for the virtual stepping signal.

The initial threshold value can be derived from a cycles per step counter that counts the number of system cycles between two oscillator pulses and then increases or decreases by one cycle per step until the virtual stepping signal matches the new master signal.

In another exemplary embodiment, a failure in the first master signal is detected when no stepping pulse arrives at the alignment logic within an a priori known tolerance time period.

In another exemplary embodiment, when a switch from the first selected oscillator signal to the other oscillator signal (i.e. a switch from one path to the other within the alignment element) is made, the following steps are performed. First, a switch is made from a first master path, to which the first selected oscillator signal applies as a first master signal, to a virtual stepping signal with the same threshold value as the first master path. Second, using an alignment logic, the virtual stepping signal is moved towards a new master path, to which the other oscillator signal applies as a new master signal, wherein said move is performed by adjusting the threshold value. Third, when both the virtual stepping signal and the new master signal are correctly aligned, the alignment logic of the alignment element is switched off, and the new master signal is used directly as an output stepping signal of the alignment element. This method not only enables a switch from one path to the other without a phase jump but also enables a switch to the virtual stepping signal when a failure in the first master signal is detected.

Another exemplary embodiment concerns an alignment element comprising a first input and a second input connected to a first time-of-day oscillator and a second time-of-day oscillator respectively. The alignment element further comprises an output selectively connected to the first input or the second input. The alignment element switches the connection of the output between the first input and the second input, wherein the input selectively connected to the output forms a master path. Moreover, the alignment element introduces a virtual stepping signal when a switch from a first master path to a new master path occurs or when there is a failure in an oscillator signal applied to the first master path. Furthermore, the alignment element sends the virtual stepping signal to the output in the event of a switch until an alignment with an oscillator signal applied to the new master path is completed. Additionally, the alignment element sends the virtual stepping signal to the output in the event of a failure of the oscillator signal applied to the first master path until switching from the first master path to the new master path is performed or until the oscillator signal applied to the first master path becomes valid again.

BRIEF DESCRIPTIONS OF THE DRAWINGS

Figure 3:
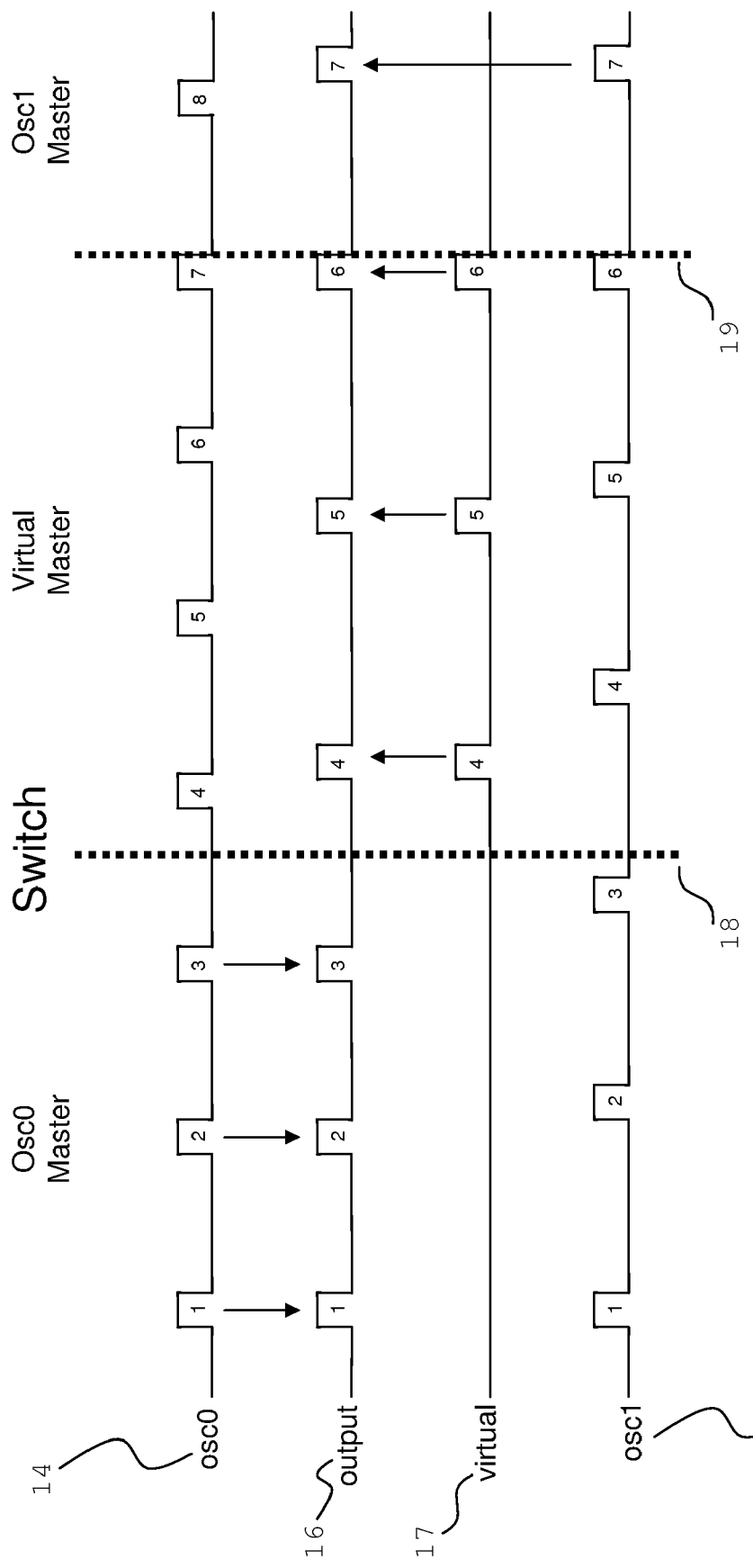
Figure 4:
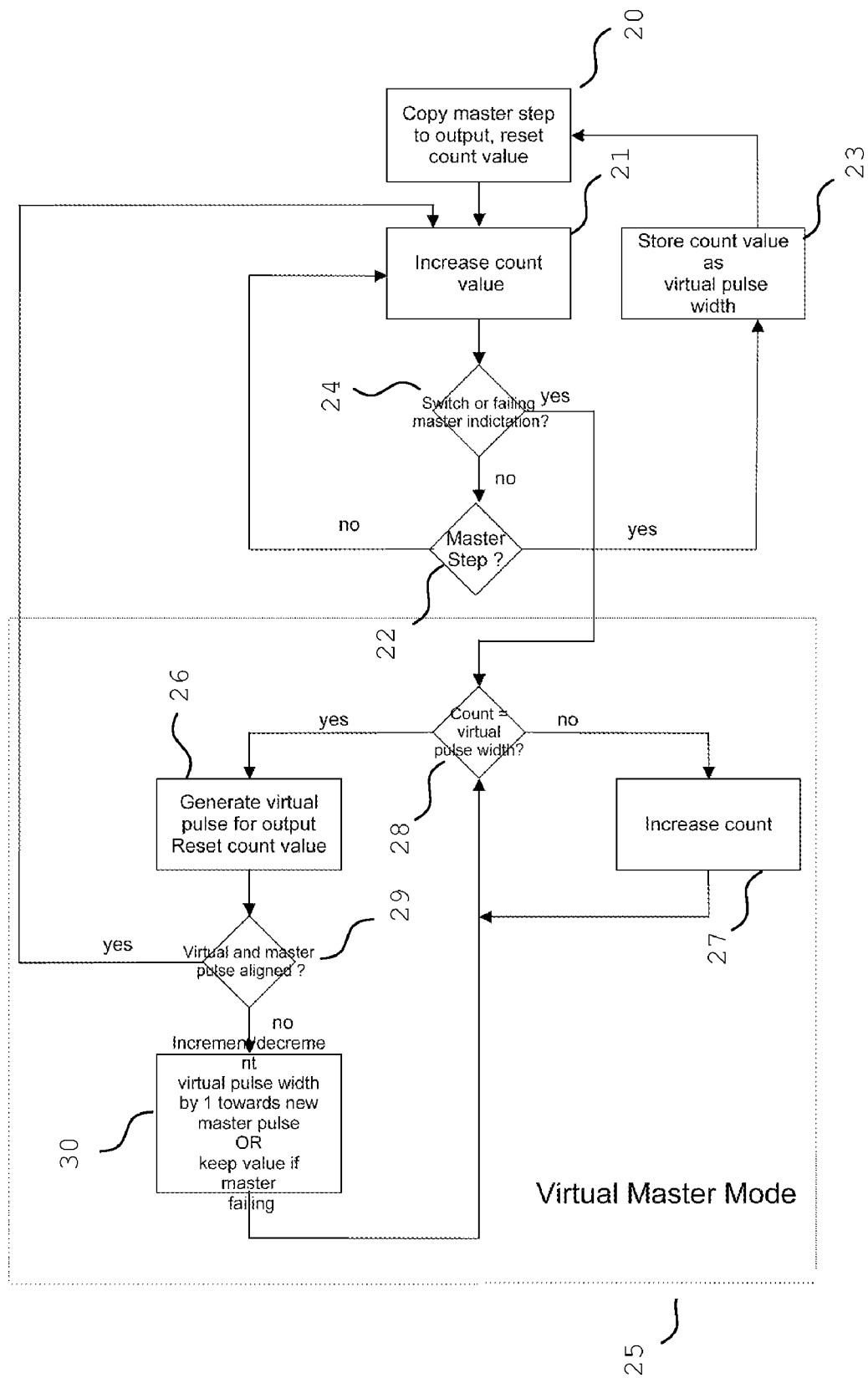
Figure 5:
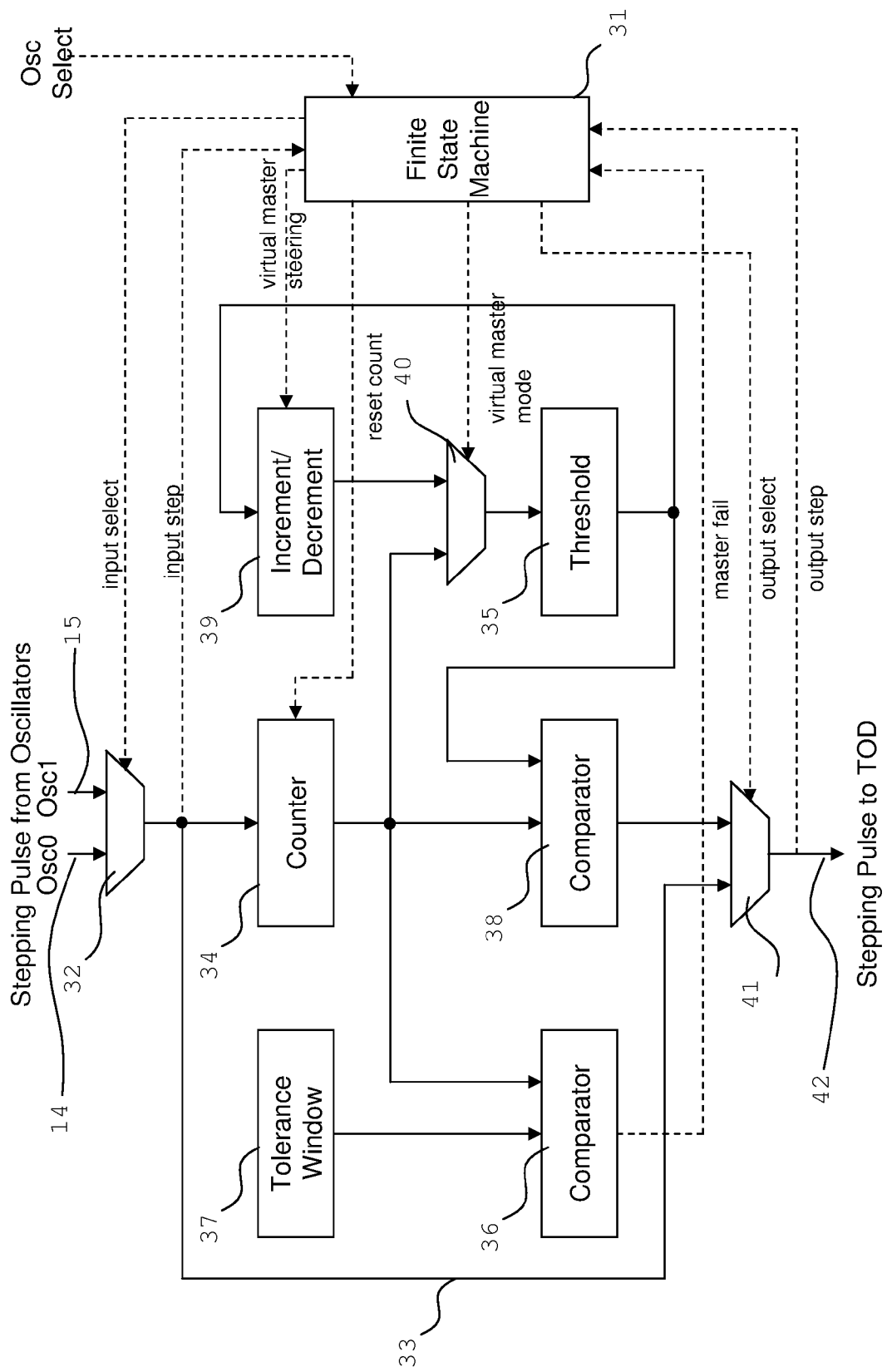

The foregoing, together with other objects, features, and advantages of various embodiments described herein, can be better appreciated with reference to the following specification, claims and drawings, with FIG. 1 showing a schematic of an alignment element according to the state of the art, FIG. 2 showing a scheme of a switching scenario according to the state of the art, FIG. 3 showing a scheme of a switching scenario according to an exemplary embodiment, FIG. 4 showing a control flow for an alignment element according to an exemplary embodiment, and FIG. 5 showing a block diagram of an alignment element according to an exemplary embodiment.

DETAILED DESCRIPTION

FIG. 3 shows how an alignment element functions according to an exemplary embodiment. Two oscillator signals 14, 15 are used as inputs, and an output 16 is copied either from one of oscillator input signals 14, 15 or from a virtual master signal 17, which is generated inside the alignment element. Initially, the oscillator signal 14 from oscillator osc0 is used as the first master signal and is copied directly to the output 16. When a path switch 18 occurs, the virtual master signal 17 is used for the output 16 and is slowly steered towards the oscillator signal 15 of oscillator osc1 (i.e., the new master signal) in order to align the virtual master signal 17 and the new master signal 15. Once the alignment 19 is completed, the new master signal 15 is copied directly to the output 16.

FIG. 4 shows an exemplary control flow for an alignment element according to an exemplary embodiment. The alignment element begins in a normal operation mode. In the initial state at step 20, the oscillator signal of the first master path is copied to the output signal. Then, the threshold value is computed by counting the number of system cycles in step 21 until the next pulse from the oscillator is detected in step 22. The resulting cycles per step value is then stored in a register in step 23. When a path switch or a failing oscillator signal is detected in step 24, the alignment element switches to a virtual master mode 25. The alignment element in step 26 generates a virtual master signal for output using a counter in step 27 with the last known threshold value as indicated in step 28.

According to step 29, once the generated virtual master signal is aligned with (i.e., matches) the signal from the new master path, the alignment element switches back to the normal operation mode. In such case, the control flow returns to step 21. Conversely, if the generated virtual master signal is not yet aligned with (i.e., does not match) the signal from the new master path, the threshold value of the virtual master signal is steered by one cycle per step as appropriate in step 30, and subsequently the control flow returns to step 28.

FIG. 5 shows a block diagram for an exemplary implementation of an alignment element comprising a first input 14 and a second input 15 connected to a first time-of-day oscillator and a second time-of-day oscillator respectively. The alignment element further comprises an output 42 selectively connected to the first input 14 or the second input 15. The alignment element switches the connection of the output 42 between the first input 14 and the second input 15, wherein the input selectively connected to the output forms a master path. Moreover, the alignment element introduces a virtual stepping signal when a switch from a first master path to a new master path occurs or when there is a failure in an oscillator signal applied to the first master path. Furthermore, the alignment element sends the virtual stepping signal to the output in the event of a switch until an alignment with the new master signal is completed. Additionally, the alignment element sends the virtual stepping signal to the output in the event of a failure in the oscillator signal applied to the first master path until switching from the first master path to the new master path is performed (i.e., until switching from the oscillator signal applied to the first master path to an oscillator signal applied to the new master path is performed) or until the oscillator signal applied to the first master path becomes valid again.

In FIG. 5, solid lines represent data flow signals, while dotted lines represent control signals generated by or connected to a finite state machine 31, which implements the control flow according to FIG. 4. From two oscillator input signals 14, 15, the signal for the first master path is selected by a multiplexer 32. During the normal operation mode, the selected oscillator signal (i.e., the first master signal) is directly copied via a signal path 33 and a multiplexer 41 to an output signal 42. The threshold value of the first master signal is determined using a counter 34 and is then stored in a threshold register 35. To detect a failure in the oscillator signal of the first master path, the counter value is compared by a comparator 36 to a predefined tolerance value defined by a tolerance window 37 stored inside the alignment element. In the virtual master mode, the counter 34 is also used to generate the output signal 42 when a comparator 38 detects that the counter value reaches the threshold value stored in the threshold register 35. The steering of the threshold value is done using an incrementer/decrementer 39 and a multiplexer 40. Switching between the normal operation mode and the virtual master mode is done via the multiplexer 41.

As previously discussed, when a switch from one path to the other is made in accordance with an exemplary embodiment, the following steps are performed. First, a switch is made from a first master path, to which a first oscillator signal applies as a first master signal, to a virtual stepping signal with the same threshold value as the first master path. Second, using an alignment logic, the virtual stepping signal is moved towards a new master path, to which another oscillator signal applies as a new master signal, wherein said move is performed by adjusting the threshold value. Third, when both the virtual stepping signal and the new master signal are correctly aligned, the alignment logic is switched off, and the new master signal is used directly as an output (FIG. 3). This method not only enables a switch from one path to the other without a phase jump but also enables a switch to the virtual stepping signal when a failure is detected in the first master signal.

Upon detection of a failure in the first master signal (e.g., when no stepping pulse arrives within an a priori known tolerance time period at the alignment logic, as provided by an aforementioned exemplary embodiment), the relevant logic switches to the virtual stepping signal and continues to send output pulses with the last measured distance between consecutive stepping pulses. If the first master signal becomes valid again, the relevant logic can slowly move the virtual stepping signal to the first master signal until both are correctly aligned.

While various embodiments have been described in detail, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present disclosure.

The invention claimed is:

1. A method for switching between two oscillator signals within an alignment element wherein one of the two oscillator signals is selected as a first master signal in order to provide an output stepping signal at an output of the alignment element, the method comprising:
   introducing a virtual stepping signal when a switch between the two oscillator signals occurs or when a failure in the first master signal is detected;
   sending the virtual stepping signal to the output of the alignment element in the event of a switch until an alignment with a new master signal is completed; and
   sending the virtual stepping signal to the output of the alignment element in the event of a failure in the first master signal until a switch to the other oscillator signal as a new master signal is performed or until the first master signal becomes valid again.

2. The method according to claim 1, wherein the oscillator signal selected as the first master signal is monitored in order to detect a failure, and wherein a switch is performed from the selected oscillator signal to the other oscillator signal to be used as a new master signal when a failure in the selected oscillator signal is detected.

3. The method according to claim 1, wherein the virtual stepping signal continues to send as the output stepping signal a signal with a last measured time distance between two consecutive stepping pulses of the first master signal.

4. The method according to claim 1, wherein if the first master signal becomes valid again, the virtual stepping signal is moved to the first master signal until both the virtual stepping signal and the first master signal are correctly aligned.

5. The method according to claim 1, wherein an alignment of the virtual stepping signal and a new master signal is performed by moving the virtual stepping signal towards the new master signal and by adjusting an initial threshold value for the virtual stepping signal.

6. The method according to claim 5, wherein the initial threshold value is derived from a cycles per step counter and then increased or decreased by one cycle per step until the virtual stepping signal matches the new master signal.

7. The method according to claim 1, wherein a failure in the first master signal is detected when no stepping pulse arrives within a tolerance time period.

8. A method for switching between two oscillator signals within an alignment element, wherein one of the two oscillator signals is selected as a first master signal in order to provide an output stepping signal at an output of the alignment element, the method comprising:
   switching from a first master path, to which the first selected oscillator signal applies as the first master signal, to a virtual stepping signal having a threshold value that is initially equivalent to a threshold value for the first master signal;
   using an alignment logic to move the virtual stepping signal towards a new master signal at a new master path, to which the other oscillator signal applies, by adjusting the threshold value for the virtual stepping signal; and
   switching off the alignment logic and using the new master signal directly as the output stepping signal when both the virtual stepping signal and the new master signal are correctly aligned.

9. An alignment element comprising a first input and a second input connected to a first time-of-day oscillator and a second time-of-day oscillator respectively and further comprising an output selectively connected to the first input or the second input, wherein the alignment element:

switches the connection of the output between the first input and the second input, wherein the input selectively connected to the output forms a master path;

introduces a virtual stepping signal when a switch from a first master path to a new master path occurs or when there is a failure in an oscillator signal applied to the first master path;

sends the virtual stepping signal to the output in the event of a switch until an alignment with an oscillator signal applied to the new master path is completed; and sends the virtual stepping signal to the output in the event of a failure of the oscillator signal applied to the first master path until switching from the first master path to the new master path is performed or until the oscillator signal applied to the first master path becomes valid again.

* * * * *